(12) United States Patent
Makino

(10) Patent No.: US 10,718,739 B2
(45) Date of Patent: Jul. 21, 2020

(54) SURFACE CHARACTERISTICS INSPECTION METHOD AND SURFACE CHARACTERISTICS INSPECTION APPARATUS FOR STEEL PRODUCT

(71) Applicant: SINTOKOGIO, LTD., Nagoya-shi, Aichi (JP)

(72) Inventor: Yoshiyasu Makino, Okazaki (JP)

(73) Assignee: SINTOKOGIO, LTD., Aichi (JP)

( * ) Notice: Subject to any disclaimer, the term of this patent is extended or adjusted under 35 U.S.C. 154(b) by 268 days.

(21) Appl. No.: 15/747,383

(22) PCT Filed: Jun. 7, 2016

(86) PCT No.: PCT/JP2016/066920
§ 371 (c)(1),
(2) Date: Jan. 24, 2018

(87) PCT Pub. No.: WO2017/022328
PCT Pub. Date: Feb. 9, 2017

(65) Prior Publication Data
US 2018/0209939 A1   Jul. 26, 2018

(30) Foreign Application Priority Data

Aug. 6, 2015 (JP) ................................. 2015-156263

(51) Int. Cl.
*G01N 27/90* (2006.01)
*C21D 7/06* (2006.01)
*C21D 11/00* (2006.01)

(52) U.S. Cl.
CPC .......... *G01N 27/9046* (2013.01); *C21D 7/06* (2013.01); *C21D 11/00* (2013.01)

(58) Field of Classification Search
USPC ..................... 324/240, 602, 750.03
See application file for complete search history.

(56) References Cited

U.S. PATENT DOCUMENTS

2011/0304328 A1   12/2011   Yamamoto
2014/0084910 A1   3/2014    Makino
(Continued)

FOREIGN PATENT DOCUMENTS

EP    2707705 A1      3/2014
JP    H06-158159 A    6/1994
(Continued)

OTHER PUBLICATIONS

Extended European Search Report in Europe Application No. 16832607.2, dated Dec. 17, 2018, pp. 1-10.
(Continued)

*Primary Examiner* — Vincent Q Nguyen
(74) *Attorney, Agent, or Firm* — Brinks Gilson & Lione

(57) ABSTRACT

To provide a surface characteristics inspection method of inspecting a heat treatment on a steel product subjected to a surface treatment in a nondestructive manner. A surface characteristics inspection apparatus is used which includes an alternating-current bridge circuit, an alternating-current power supply that supplies an alternating-current power to the alternating-current bridge circuit, and an evaluation device that evaluates the surface characteristics of a subject, which is a steel product subjected to a heat treatment, based on an output signal of the alternating-current bridge circuit. Coils of a reference detector and an inspection detector in the bridge circuit are energized to produce an alternating-current magnetism to induce an eddy current in a reference subject and the subject, respectively, and the electromagnetic characteristics of the subject obtained in the state where the reference detector detects a reference state is output as a first output signal.

6 Claims, 7 Drawing Sheets

(56) References Cited

U.S. PATENT DOCUMENTS

2016/0341699 A1    11/2016  Makino et al.
2017/0108470 A1*   4/2017   Makino .............. G01N 27/9046

FOREIGN PATENT DOCUMENTS

| JP | 10-217122 A | 8/1998 |
| JP | 2009-168556 A | 7/2009 |
| JP | 2010-197174 A | 9/2010 |
| JP | 2013-529286 A | 7/2013 |
| WO | WO 2012/153862 | 11/2012 |
| WO | WO 2015/107725 A1 | 7/2015 |

OTHER PUBLICATIONS

Anonymous, "Skin effect—Wikipedia, the free encyclopedia", dated Jul. 18, 2015, retrieved from the Internet on Dec. 3, 2018 from URL: <https://web.archive.org/web/20150718203240 /https://en.wikipedia.org/wiki/Skin_effect>.

International Search Report, and English language translation thereof, in corresponding International Application No. PCT/JP2016/066920, dated Aug. 16, 2016, 5 pages.

* cited by examiner

SURFACE CHARACTERISTICS INSPECTION METHOD AND SURFACE CHARACTERISTICS INSPECTION APPARATUS FOR STEEL PRODUCT

This application is a 371 application of PCT/JP2016/066920 having an international filing date of Jun. 7, 2016, which claims priority to JP2015-156263 filed Aug. 6, 2015, the entire content of each of which is incorporated herein by reference.

TECHNICAL FIELD

The present invention relates to a surface characteristics inspection method and a surface characteristics inspection method that inspect the state of a surface of a steel product subjected to a surface treatment.

BACKGROUND ART

It is widely known to perform a heat treatment (such as hardening, tempering, nitriding or carburization) on a steel product used as a part of an automobile, such as a gear or a shaft, in order to improve the mechanical properties thereof. Besides, a surface treatment method that performs a shot peening treatment (shot peening will be abbreviated as "SP", hereinafter) for imparting a compressive residual stress on the steel product subjected to the heat treatment is widely adopted (see Patent Literature 1, for example).

The heat treatment is usually performed in a batch process, so that the degree of the heat treatment varies among the steel products. Thus, even if the SP treatment conditions are properly managed, the degree of the surface treatment on the steel products varies. Thus, it is required to inspect whether the surface treatment has been properly performed on the steel products or not.

In Patent Literature 2, the inventor has disclosed a surface characteristics inspection apparatus capable of inspecting the surface treatment state of a processed material, such as a steel material, subjected to a surface treatment.

CITATION LIST

Patent Literature

Patent Literature 1: Japanese Patent Laid-Open No. H06-158159
Patent Literature 2: Japanese Patent Laid-Open No. 2013-529286

SUMMARY OF INVENTION

Technical Problem

However, the heat treatment leaves a deeper affected layer than SP, and it is difficult to precisely measure the degree of the heat treatment in the conventional surface characteristics inspection method. An object of the present invention is to provide a method and an apparatus that inspects a steel product subjected to at least a heat treatment as a surface treatment and precisely inspect whether the heat treatment has been properly performed or not.

Solution to Problem

A surface characteristics inspection method according to an aspect of the present invention is a surface characteristics inspection method of evaluating a degree of a heat treatment on a steel product subjected to a surface treatment including the heat treatment. The surface characteristics inspection method uses a surface characteristics inspection apparatus including an alternating-current bridge circuit, an alternating-current power supply that supplies an alternating-current power to the alternating-current bridge circuit, and an evaluation device that evaluates the degree of the heat treatment on the steel product subjected to the surface treatment including the heat treatment based on an output signal of the alternating-current bridge circuit. The alternating-current bridge circuit is a bridge circuit composed of a variable resistor configured to be capable of being divided into a first resistor and a second resistor with a division ratio, a reference detector including a coil capable of inducing an alternating-current magnetism, and an inspection detector including a coil capable of inducing an alternating-current magnetism. The surface characteristics inspection method includes the following steps (1) to (5). The steps may be separately performed, or two or more of the steps may be performed at the same time.

(1) A preparation step of preparing the steel product subjected to at least the heat treatment, a reference subject having the same structure as the steel product, and the surface characteristics inspection apparatus.

(2) A placement step of placing the coil of the reference detector so as to induce an eddy current in the reference subject and placing the coil of the inspection detector so as to induce an eddy current in the steel product.

(3) An alternating current supply step of supplying the alternating-current power to the alternating-current bridge circuit.

(4) A detection step of energizing the coil of the reference detector and the coil of the inspection detector to make the coils produce an alternating-current magnetism to induce an eddy current in the reference subject and the steel product, respectively, and detecting, as a first output signal, an electromagnetic characteristic of the steel product in a state where the reference detector detects a reference state.

(5) A heat treatment evaluation step of the evaluation device comparing a value computed based on the first output signal with a first threshold to evaluate the degree of the heat treatment performed on the steel product.

An excitation frequency of the coils of the reference detector and the inspection detector is set at 500 Hz to $10 \times 10^3$ Hz.

Since the excitation frequency of the coils of the reference detector and the inspection detector is set within the range from 500 Hz to $10 \times 10^3$ Hz, the depth of permeation of the eddy current produced by the coils into the subject can be set depending on the depth of the layer affected by the heat treatment. Under such conditions, the degree of the heat treatment can be precisely evaluated by detecting the electromagnetic characteristics of the steel product and performing computations based on the detection result.

The "surface characteristics" means characteristics of the outermost surface of the subject and the inner affected layer. The expression "having the same structure" means being made of the same material and having the same shape, whether the surface treatment has been performed or not. Thus, a steel product made of the same material and having the same shape can be used as the reference subject whether the surface treatment has been performed thereon or not.

In the surface characteristics inspection method according to the embodiment of the present invention, the detection step may be performed on the steel product which has been subjected to a shot peening treatment following the heat treatment. The first output signal may indicate the electromagnetic characteristic of the steel product subjected to the shot peening treatment following the heat treatment.

The heat treatment is usually performed in a batch process, so that the heat treatment tends to vary among the subjects. In addition, the heat treatment leaves a deeper affected layer than other surface treatments, so that it is difficult to precisely evaluate the degree of the heat treatment in a nondestructive manner. On the other hand, the SP treatment can be performed in a relatively stable manner by controlling the SP treatment conditions. The inventor has found that, by evaluating the electromagnetic characteristics of the steel product subjected to the heat treatment and the SP treatment, the degree of the heat treatment can be more precisely evaluated than in the case where the electromagnetic characteristics are evaluated immediately after the heat treatment. In addition, the evaluation result can be fed back to the heat treatment step. Thus, the reduction of the product yield due to defective heat treatment can be suppressed.

In the surface characteristics inspection method according to the embodiment of the present invention, the steel product prepared in the preparation step may be a steel product that has been subjected to the heat treatment and has not been subjected to the shot peening treatment. The surface characteristics inspection method may further include a preliminary detection step of the surface characteristics inspection apparatus detecting the electromagnetic characteristic of the steel product that has been subjected to the heat treatment, and a shot peening step of performing the shot peening treatment on the steel product after the preliminary detection step. The preliminary detection step may be to supply an alternating-current voltage to the coils of the reference detector and the inspection detector to make the coils induce an eddy current in the reference subject and the subject placed in the reference detector and the inspection detector, respectively, and to obtain, as a second output signal, the electromagnetic characteristic of the subject in the state where the reference detector detects the reference state, and the evaluation device may evaluate the degree of the heat treatment on the subject based on the first output signal and the second output signal in the heat treatment evaluation step.

In the surface characteristics inspection method according to the embodiment of the present invention, the heat treatment evaluation step may include a step of evaluating the degree of the heat treatment on the steel product by computing a ratio between the first output signal and the second output signal and comparing the ratio with the first threshold. Owing to the second output signal, variations of the first output signal among individual steel products can be reduced, so that the measurement precision can be further improved.

In the surface characteristics inspection method according to the embodiment of the present invention, both the first output signal and the second output signal may indicate a potential difference between the reference detector and the inspection detector. Environmental influences (such as temperature, humidity or noise) on the threshold setting or inspection can be reduced. In addition, if a differential amplifier is provided downstream of the alternating-current bridge circuit, the potential difference can be amplified. This also improves the precision of the inspection.

In the surface characteristics inspection method according to the embodiment, the first threshold may be a value calculated based on an electromagnetic characteristic of a steel product yet to be subjected to the heat treatment and the SP treatment, that is, a steel product yet to be subjected to any surface treatment (referred to as a "product yet to be treated", hereinafter) and an electromagnetic characteristic of the steel product that has been properly subjected to only the heat treatment (referred to as a "heat-treated reference product", hereinafter). In the heat treatment evaluation step, the degree of the heat treatment on the steel product may be evaluated by comparing the value calculated based on the first output signal and the second output signal with the first threshold. Since variations of the measurements among individual steel products can be reduced, the threshold can be appropriately set.

In the surface characteristics inspection method according to the embodiment of the present invention, the heat treatment evaluation step may further includes a step of evaluating whether the SP treatment has been properly performed on the subject or not by computing the first output signal and comparing the value with a second threshold. Since the result of evaluation of the SP treatment can be fed back to the SP treatment, the SP treatment can be performed in a stable manner, and the precision of the evaluation of the degree of the heat treatment is improved. That is, the reduction of the product yield due to defective heat treatment can be further suppressed.

In the surface characteristics inspection method according to the embodiment, the second threshold $E_{th2}$ may be a value calculated according to the following formula based on an output signal $E_A$ obtained when the subject yet to be subjected to the heat treatment and the shot peening treatment is placed in the inspection detector and an output signal $E_C$ obtained when the subject properly subjected to the heat treatment and the shot peening treatment is placed in the inspection detector:

$$E_{th2} = \frac{(E_{Aav} \cdot \sigma_C + E_{Cav} \cdot \sigma_A)}{\sigma_A + \sigma_C}$$

where $E_{Av}$ denotes an average value of the output signals $E_A$, $E_{Cav}$ denotes an average value of output signals $E_C$, $\sigma_A$ denotes a standard deviation of the output signals $E_A$, and $\sigma_C$ denotes a standard deviation of the output signals $E_C$, and the evaluation device may repeat the heat treatment evaluation step using the second threshold as an initial value.

According to the formula, an appropriate initial threshold can be precisely set with a reduced number of measurements.

Another aspect of the present invention is a surface characteristics inspection apparatus that evaluates a degree of a heat treatment on a steel product that has been subjected to a surface treatment including at least the heat treatment. The surface characteristics inspection apparatus includes an alternating-current bridge circuit including a variable resistor, a reference detector, and an inspection detector, an alternating-current power supply that supplies an alternating-current power to the alternating-current bridge circuit, and an evaluation device that evaluates the degree of the heat treatment on the steel product based on an output signal of the alternating-current bridge circuit. The variable resistor is configured to be capable of being divided into a first resistor and a second resistor with a division ratio. The reference detector includes a coil capable of inducing an alternating-current magnetism. The inspection detector includes a coil capable of inducing an alternating-current magnetism. An excitation frequency of the coils of the reference detector and the inspection detector is set at 500 Hz to $10 \times 10^3$ Hz.

Since the excitation frequency of the coils of the reference detector and the inspection detector is set to fall within this range, the depth of permeation of the eddy current produced by the coils into the subject can be set depending on the depth of the layer affected by the heat treatment. Under such conditions, the degree of the heat treatment can be precisely evaluated by detecting the electromagnetic characteristics of the steel product and performing computations based on the detection result.

In addition, the surface characteristics inspection apparatus used in the surface characteristics inspection method uses the reference subject having the same structure as the subject when outputting a detection signal, so that the surface characteristics inspection apparatus is less susceptible to environmental influences (such as temperature or humidity) due to differences in when the measurement is performed. Thus, the precision of the measurement can be improved.

In the embodiment of the present invention, the steel product subjected to the surface treatment may be a steel product subjected to a shot peening treatment following the heat treatment. By evaluating the electromagnetic characteristics of the steel product subjected to the heat treatment and the SP treatment, the degree of the heat treatment can be more precisely evaluated than in the case where the electromagnetic characteristics are evaluated immediately after the heat treatment.

Advantageous Effect of Invention

According to the aspects and the embodiments, there is provided a surface characteristics inspection method capable of precisely inspecting whether a surface treatment in which at least a heat treatment is performed on a steel product has been properly performed or not.

DETAILED DESCRIPTION OF EMBODIMENTS

First Embodiment

Figure 1A:
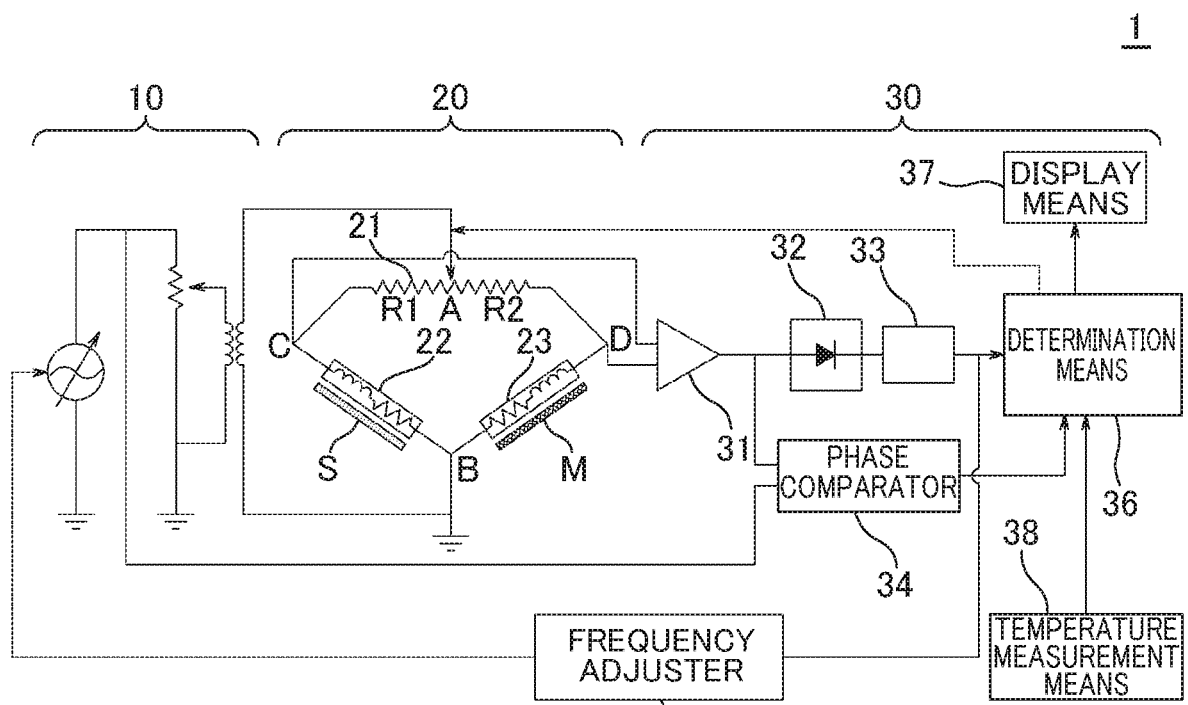
FIG. 1A is a schematic diagram for illustrating a configuration of a surface characteristics inspection apparatus according to an embodiment and particularly showing a circuit configuration of the surface characteristics inspection apparatus.

In the present invention, a steel product whose surface characteristics are inspected has been subjected to a surface treatment that involves a heat treatment (such as hardening, tempering, annealing, nitriding, or austempering) followed by an SP treatment. As a first embodiment of the present invention, which is an aspect of the present invention, a surface characteristics inspection method for the steel product subjected to the surface treatment will be described with reference to the drawings. In the following description, the upward, downward, leftward and rightward directions indicate the respective directions in the drawings unless otherwise specified.

(Surface Characteristics Inspection Apparatus)

As shown in FIG. 1A, a surface characteristics inspection apparatus 1 according to the embodiment of the present invention includes an alternating-current power supply 10, an alternating-current bridge circuit 20 and an evaluation device 30.

The alternating-current power supply 10 is configured to be capable of supplying an alternating-current power with a variable frequency to the alternating-current bridge circuit 20.

The alternating-current bridge circuit 20 includes a variable resistor 21, a reference detector 22, and an inspection detector 23. The inspection detector 23 is configured so that a coil can be placed to induce an eddy current in a subject M. The reference detector 22 is configured so that a reference subject S having the same structure as the subject M can be placed therein. The expression "having the same structure as the subject M" means being made of the same material and having the same shape, whether the surface treatment has been performed or not.

The variable resistor 21 is configured to divide a resistance $R_A$ into a resistance $R_1$ and a resistance $R_2$ at a division ratio $\gamma$. The division ratio $\gamma$ can be arbitrarily set. The resistors R1 and R2 form the bridge circuit in cooperation with the reference detector 22 and the inspection detector 23. In this embodiment, the bridge circuit 20 is connected to the alternating-current power supply 10 of the surface characteristics inspection apparatus 1 at a point A between the resistors R1 and R2 and a point B between the reference detector 22 and the inspection detector 23, and to an amplification circuit 31 of the evaluation device 30 at a point C between the resistor $R_1$ and the reference detector 22 and a point D between the resistor $R_2$ and the inspection detector 23. To reduce noise, the bridge circuit is grounded at the point B of connection between the reference detector 22 and the inspection detector 23. The reference detector 22 and the inspection detector 23 will be described in more detail later.

The evaluation device 30 includes the amplification circuit 31, an absolute value circuit 32, a low pass filter (LPF) 33, a phase comparator 34, a frequency adjuster 35, determination means 36, display means 37, and temperature measurement means 38. In addition, the evaluation device 30 includes storage means in the determination means 36 or in a section not shown.

The amplification circuit 31 receives the potential difference between the points C and D, that is, the potential difference between the reference detector 22 and the inspection detector 23 and amplifies the voltage signal. The signal output from the amplification circuit 31 is input to the absolute value circuit 32, which full-wave rectifies the signal. The resulting signal is output from the absolute value circuit 32 and input to the LPF 33, which converts the signal into a direct-current signal, and the resulting signal is connected to the determination means 36.

The phase comparator 34 is connected to the alternating-current power supply 10, the amplification circuit 31 and the determination means 36, compares the phase of the alternating-current voltage supplied from the alternating-current power supply 10 and the phase of the voltage output from the amplification circuit 31, and outputs the comparison result to the determination means 36.

The frequency adjuster 35 is connected to the alternating-current power supply 10 and an output side of the LPF 33 and serves to adjust the frequency of the alternating-current voltage supplied from the alternating-current power supply 10 based on the output of the LPF 33.

The determination means 36 is configured to be capable of changing the position of the point A in the alternating-current bridge circuit 20, that is, the division ratio γ between the resistors $R_1$ and $R_2$, by outputting a control signal. This enables unbalanced adjustment (a variable resistor setting step described later) that optimizes the division between the resistors $R_1$ and $R_2$. In addition, whether the surface state of the subject M is good or bad is determined based on the output of the LPF 33.

The display means 37 displays the result of the determination by the determination means 36 or provides a warning about the determination result.

The temperature measurement means 38 detects the temperature of a point for evaluation, that is, the temperature of the surface of the subject M, and outputs the resulting temperature signal to the determination means 36. The temperature measurement means 38 may be a non-contact infrared sensor or thermocouple.

The determination means 36 determines whether the surface treatment state of the subject M is good or bad when the temperature of the subject M detected by the temperature measurement means 38 falls within a predetermined range. When the temperature detected by the temperature measurement means 38 does not fall within the predetermined range, the determination means 36 does not determine whether the surface treatment state of the subject M is good or bad. That is, the determination means 36 can avoid determining whether the surface treatment state of the subject is good or bad when the temperature of the subject M affects the precision of the inspection, so that the precision of the inspection can be improved. As an alternative, the temperature at the point for evaluation may be measured by a thermocouple, and whether to determine whether the surface treatment state of the subject M may be determined based on the measured temperature as a representative temperature of the surface of the subject M.

Next, the reference detector 22 and the inspection detector 23 will be described. The reference detector 22 and the inspection detector 23 are configured in the same way: both detectors are formed by a core into which a part for evaluation of the subject M can be inserted and a coil wound around the outer surface of the core, the coil being opposed to the surface of the subject M in the vicinity thereof so that the coil can induce an eddy current in the subject M. In other words, the coil is wound to be opposed to and surround the region for surface characteristics inspection of the subject. The expression surround the region for surface characteristics inspection of the subject means surround (cover) at least a part of the region for surface characteristics inspection and implies that the coil induces an eddy current in the region for surface characteristics inspection.

Figure 1B:
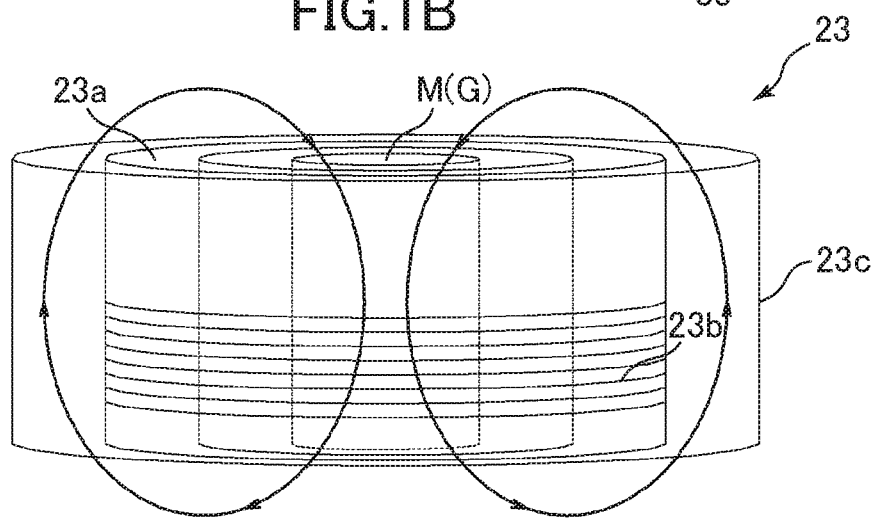
FIG. 1B is a schematic diagram (perspective view) for illustrating a configuration of the surface characteristics inspection apparatus according to the embodiment and particularly showing a configuration of an inspection detector.

The inspection detector 23 used for inspecting the surface characteristics of a gear unit G provided with a gear section as the subject M will be now described. As shown in FIG. 1B, the inspection detector 23 includes a cylindrical core 23a formed to cover the gear section of the gear unit G and a coil 23b wound around the outer surface of the core 23a. The core 23a is made of a non-magnetic material (such as a resin). The shape of the core 23a is not limited to the cylindrical shape, and the core 23a can have any shape as far as the gear unit G can be placed inside the core 23a. In surface characteristics inspection, the subject M is not placed in the reference detector 22, but the reference subject S that provides a reference output is placed in the reference detector 22.

The inspection detector 23 according to this embodiment is preferably placed with respect to the subject M in such a manner that an eddy current flows in a region for surface characteristics inspection. That is, the inspection detector 23 is preferably placed in such a manner that the direction of winding of the coil 23b agrees with the desired direction in which the eddy current flows. With such a configuration, and the surface characteristics can be evaluated by precisely detecting the reaction of the eddy current.

When the gear unit G is subjected to the SP treatment, a residual stress layer is formed in the gear section. When the gear unit G is evaluated as the subject M, it is preferred to evaluate the surface characteristics of not only the tooth tips but also the tooth surfaces and the tooth bottoms. Thus, the coil 23b is preferably placed in such a manner that the direction of winding of the coil 23b is substantially perpendicular to the rotation axis of the gear unit G. In that case, a magnetic field loop occurs in the direction of the rotation axis, so that the eddy current can be induced in the direction of rotation of the gear unit G. Thus, the surface characteristics of not only the tooth tips but also the tooth surfaces and the tooth bottoms can be evaluated. With the conventional contact detector, different detectors need to be prepared for different tooth shapes, and only the surface characteristics of a part of the subject M around the point at which the detector is in contact with the subject M can be inspected. To the contrary, the surface characteristics inspection apparatus 1 according to this embodiment can inspect the surface characteristics of a wide area with a single detector at once.

The inspection detector 23 may not have the core 23a, as far as the coil 23b can keep its shape. Such a coil 23b may be formed by winding an enameled copper wire about an air core and bonding the windings with a curable epoxy resin or the like or winding a thermosetting fusion enameled copper wire about an air core and making the fusion enameled copper wire set in hot air or heat in a drying oven or the like, for example.

Once the inspection detector 23 is placed in such a manner that the coil 23b is opposed to and surrounds the a surface to be inspected of the subject M, and an alternating-current power with a predetermined frequency is supplied to the coil 23b from the alternating-current power supply 10, an alternating-current magnetic field occurs, and an eddy current flowing in a direction intersecting the alternating-current magnetic field is induced in the surface of the subject M. The eddy current varies with the surface characteristics of the subject M. Thus, based on variations in the potential difference between the points C and D output from the amplification circuit 31, the electromagnetic characteristics can be detected, and an inspection concerning the degree of the heat treatment can be made.

In addition, depending on the characteristics (surface treatment state) of the residual stress layer formed after the SP treatment, the eddy current varies in phase and amplitude (impedance) of the output waveform (voltage waveform) provided by the amplification circuit 31. Based on the variations of the output waveform, the electromagnetic characteristics of the treated surface layer can be detected, and an inspection concerning the degree of the surface treatment can be made.

The inspection detector 23 may be provided with a magnetic shield 23c. According to this embodiment, the magnetic shield 23c is placed to surround the subject M on the outer side of the inspection detector 23. The magnetic shield 23c screens out an external magnetism and can prevent erroneous detection.

Figure 2:
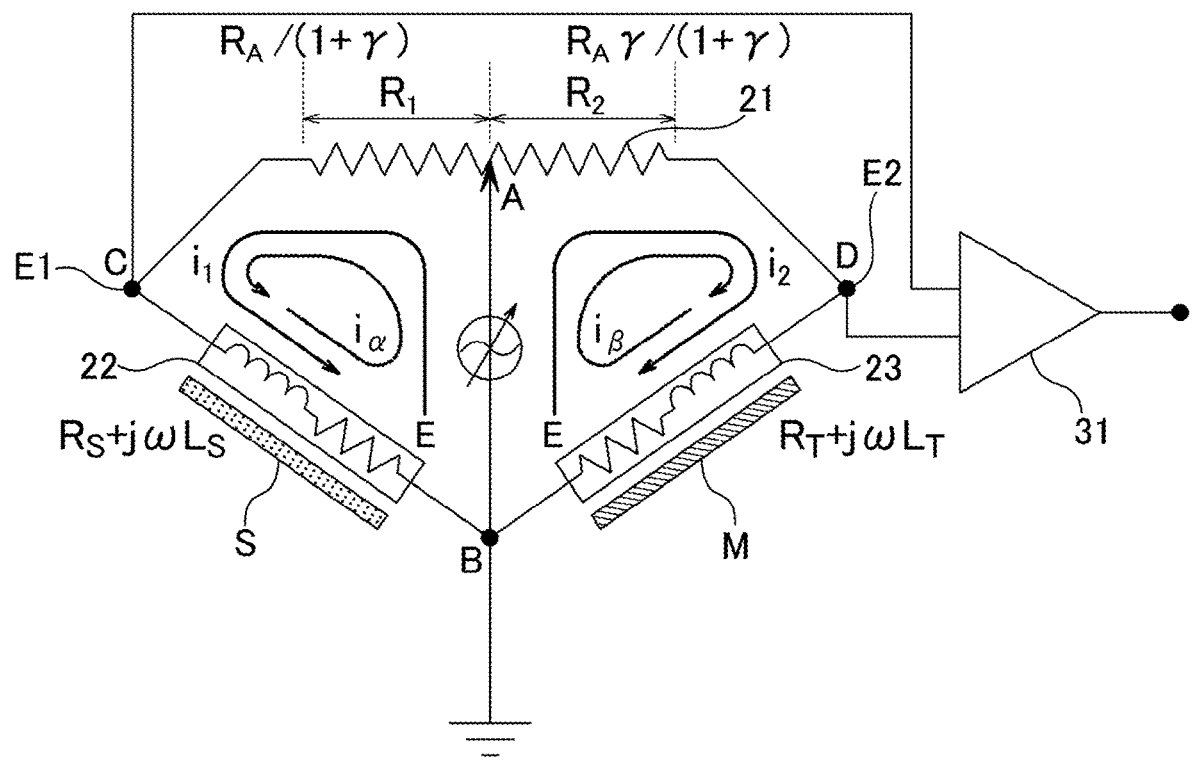
FIG. 2 is a schematic diagram for illustrating an output of an alternating-current bridge circuit according to the embodiment.

Next, the output of the alternating-current bridge circuit 20 adjusted to an unbalanced state will be described with reference to the equivalent circuit shown in FIG. 2. The reference subject S for providing a reference output is placed in the vicinity of the reference detector 22, and the subject M for which whether the surface treatment state is good or bad is placed in the vicinity of the inspection detector 23. The reference subject S has the same structure as the subject M and is not preferably subjected to any surface treatment.

Assuming that the division ratio of the variable resistor $R_A$ is $\gamma$, the resistance $R_1$ is $R_A/(1+\gamma)$, the resistance $R_2$ is $R_A\gamma/(1+\gamma)$. The impedance of the reference detector 22 is represented as $R_S+j\omega L_S$, and the impedance of the inspection detector 23 is represented as $R\gamma+j\omega L_T$. The potential at the point A is denoted as E, induced currents flowing in the relevant sides of the bridge when the subjects (the reference subject S and the subject M) are not placed in the vicinity of the reference detector 22 and the inspection detector 23 are denoted as $i_1$ and $i_2$, respectively, and currents that flow after the amount of magnetism has varied as a result of the subjects being brought close to the reference detector 22 and the inspection detector 23 are denoted as $i_\alpha$ and $i_\beta$, respectively. Potentials $E_1$ and $E_2$ and induced current $i_1$ and $i_2$ of the reference detector 22 and the inspection detector 23 are expressed by the following formulas (1) to (4).

[Formula 1]
$$E_1 = (R_s + j\omega L_s)(i\alpha + i_1) \quad (1)$$

[Formula 2]
$$E_2 = (R_s + j\omega L_s)(i\beta + i_2) \quad (2)$$

[Formula 3]
$$i_1 = \frac{E}{\frac{R_A}{1+\gamma} + R_S + j\omega L_S} \quad (3)$$

[Formula 4]
$$i_2 = \frac{E}{\frac{R_A \gamma}{1+\gamma} + R_r + j\omega L_r} \quad (4)$$

The voltage output to the amplification circuit 31 is the difference between the potentials $E_1$ and $E_2$ and is expressed by the following formula.

[Formula 5]
$$E1-E2=[\{(R_r+j\omega L_T)i\beta-(R_S+j\omega L_S)i\alpha\}+\{(R_r+j\omega L_T)i_2-(R_S+j\omega L_S)i_1\}] \quad (5)$$

The formulas (3) and (4) are substituted into the formula (5), and the right side of the resulting formula is divided into the following constituents A and B. In the following, the constituents A and B of the differential voltage will be discussed.

$$(R_\gamma + j\omega L_T)i\beta - (R_S + j\omega L_S)i\alpha \qquad \text{Constituent A}$$

$$(R_r + j\omega L_T)\frac{E}{\frac{R_A\gamma}{1+\gamma} + R_r + j\omega L_r} - \qquad \text{Constituent B}$$

$$(R_S + j\omega L_S)\frac{E}{\frac{R_A}{1+\gamma} + R_S + j\omega L_S}$$

The constituent A is formed by the detector constituents $(R_S+j\omega L_S)$ and $(R_\gamma+j\omega L_T)$ and the amounts of current $i_\alpha$ and $i_\beta$ that vary when the subjects are brought close to the respective detectors. The amounts of current $i_\alpha$ and $i_\beta$ vary with the amounts of magnetism passing through the respective subjects, which are attributed to the electromagnetic characteristics of the subjects, such as magnetic permeability and conductivity. Thus, the amounts of current $i_\alpha$ and $i_\beta$ can be changed by changing the amounts of induced current $i_1$ and $i_2$, which affect the amounts of magnetism produced by the respective detectors. In addition, as can be seen from the formulas (3) and (4), the induced currents $i_1$ and $i_2$ vary with the division ratio $\gamma$ of the variable resistor. Thus, the magnitude of the constituent A can be changed by adjusting the division ratio $\gamma$ of the variable resistor.

The constituent B is formed by the detector constituents $(R_S+j\omega L_S)$ and $(R_\gamma+j\omega L_T)$ and parameters of the resistance of the variable resistor divided by the division ratio $\gamma$. Thus, as with the constituent A, the magnitude of the constituent B can be changed by adjusting the division ratio $\gamma$ of the variable resistor.

Once the subject M is placed at a predetermined position, and an alternating-current power with a predetermined frequency is supplied from the alternating-current power supply 10 to the coil 23b of the inspection detector 23, an eddy current that flows in a direction intersecting the alternating-current magnetism is induced in the surface of the subject M. The eddy current varies with the electromagnetic characteristics of the residual stress layer, so that the phase and amplitude (impedance) of the output waveform (voltage waveform) provided by the amplification circuit 31 varies with the characteristics (surface treatment state) of the residual stress layer. Based on the variations of the output waveform, the electromagnetic characteristics of the residual stress layer can be detected, and the treated surface layer can be inspected.

The signal output from the amplification circuit 31 of the bridge is a signal of the differential area between the voltage waveforms of the reference detector 22 and the inspection detector 23, and the circuit is configured to keep the current (excitation current) flowing through the detectors constant. The extracted voltage signal can be regarded as a power signal. In addition, the power supplied to the detectors is always constant. Thus, the magnetic energy supplied to the subject M can be regarded as being constant.

(Surface Characteristics Inspection Method)

Figure 3:
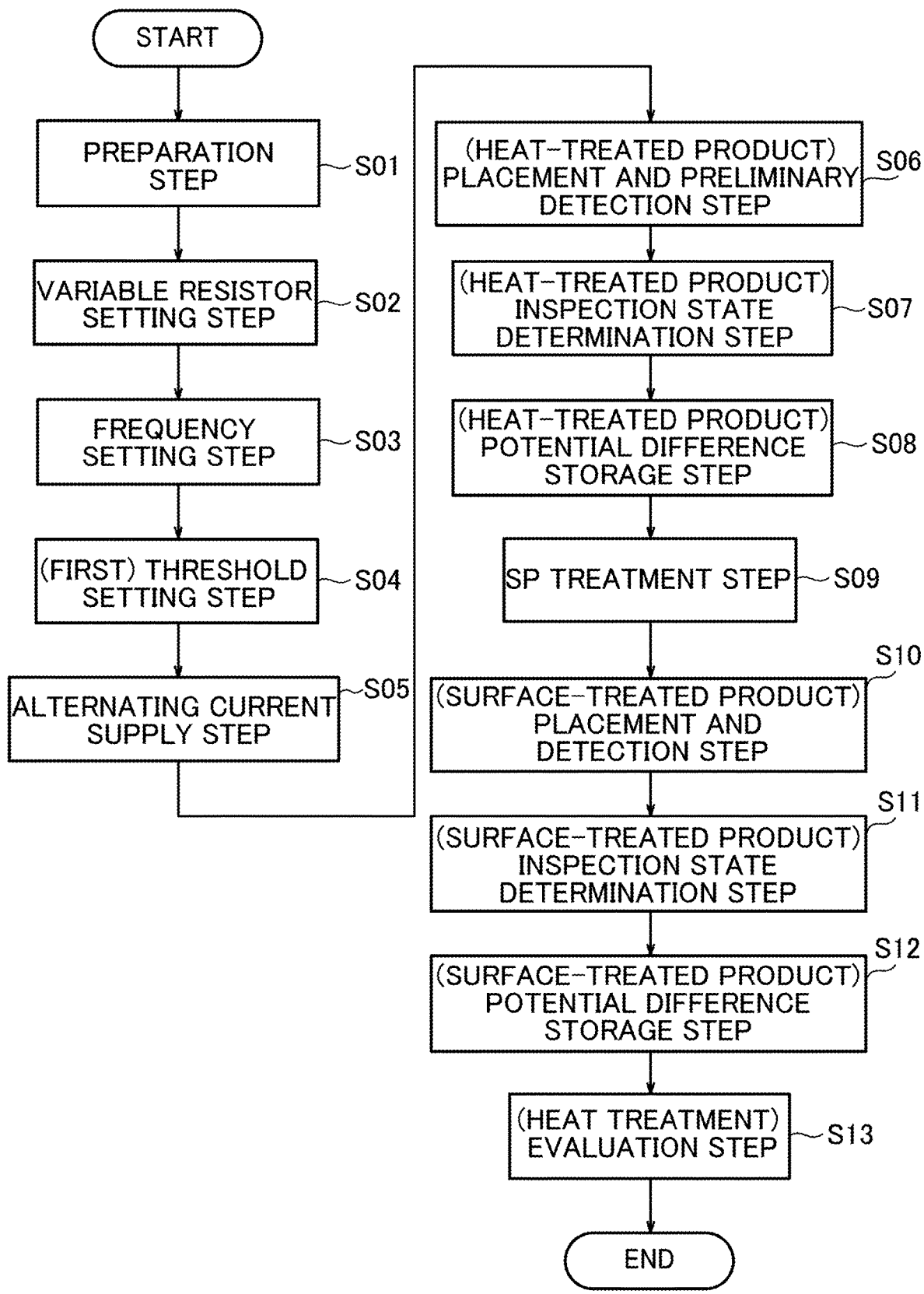
FIG. 3 is a flowchart for illustrating a surface characteristics inspection method according to a first embodiment.

Next, a surface characteristics inspection method for a steel product with the surface characteristics inspection apparatus 1 will be described with reference to FIG. 3.

<S01: Preparation Step>

The surface characteristics inspection apparatus 1, the reference subject S, a product yet to be treated, and a steel product subjected to only a heat treatment (referred to as a "heat-treated product", hereinafter) are prepared.

<S02: Variable Resistor Setting Step>

First, an alternating-current power is supplied from the alternating-current power supply 10 to the alternating-current bridge circuit 20. In this state, the division ration γ of the variable resistor 21 is adjusted to raise the detection sensitivity of the surface characteristics inspection apparatus 1 to the subject. That is, the division ratio γ of the variable resistor 21 is adjusted to reduce the output signal of the alternating-current bridge circuit 20 in the state where the reference subject S and the subject M are not placed in the vicinity of the reference detector 22 and the inspection detector 23, respectively. If the variable resistor 21 is set in this way, the output signal varies significantly between when the surface treatment state of a steel product subjected to a surface treatment (referred to as a "surface-treated product", hereinafter) placed in the vicinity of the inspection detector 23 is bad and when the surface treatment state of the surface-treated product is good, and the detection precision can be improved. More specifically, the amplitude of the voltage of the output signal of the alternating-current bridge circuit 20 or the voltage output of the LPF 33 is monitored with a display device with a waveform display function (provided in the determination means 36, for example), such as an oscilloscope, and the division ratio γ is adjusted to reduce the output. Preferably, the division ratio γ of the variable resistor 21 is adjusted and set so that the output assumes a minimum value or a local minimum value (local equilibrium value).

The adjustment of the division ratio γ of the variable resistor 21 is performed in order to reduce the output voltage $(E_2-E_1)$ of the amplification circuit 31, thereby increasing the output difference, which responds to a variation of the surface state, and improving the detection precision. As described above, the constituents A and B vary as a result of the division ratio γ being adjusted. Thus, the division ratio γ of the variable resistor 21 can be adjusted to reduce the output voltage $(E_2-E_1)$ of the amplification circuit 31, which is the differential output of the alternating-current bridge circuit 20, in accordance with the impedances $(R_S+j\omega L_S)$ and $(R\gamma+j\omega L_T)$ of the reference detector 22 and the inspection detector 23. In this way, the difference in characteristics between the reference detector 22 and the inspection detector 23 can be alleviated, and as much of the inherent characteristics of the subject M as possible can be extracted, so that the inspection precision can be improved.

<S03: Frequency Setting Step>

In the state where the reference subject S is placed in the vicinity of the reference detector 22, an alternating-current power is supplied from the alternating-current power supply 10 to the alternating-current bridge circuit 20, and the voltage amplitude output of the alternating-current bridge circuit 20 or the voltage output of the LPF 33 is monitored while the frequency adjuster 35 is changing the frequency of the alternating-current power supplied to the alternating-current bridge circuit 20.

The frequency adjuster 35 outputs a control signal to the alternating-current power supply 10 to set an initial frequency $f_1$ set by the frequency adjuster 35, and receives and stores an output voltage $E_{f1}$ from the amplification circuit 31 at the frequency $f_1$. The frequency adjuster 35 then outputs a control signal to the alternating-current power supply 10 to set a frequency $f_2$ that is higher than the frequency $f_1$ by a predetermined value, such as 100 Hz, and receives and stores an output voltage $E_{f2}$ from the amplification circuit 31 at the frequency $f_2$. The frequency adjuster 35 compares the $E_{f1}$ and $E_{f2}$. If $E_{f2}>E_{f1}$, the frequency adjuster 35 outputs a control signal to set a frequency $f_3$ that is higher than the frequency $f_2$ by a predetermined value and receives and stores an output voltage $E_{f3}$ from the amplification circuit 31 at the frequency $f_3$. The frequency adjuster 35 then compares $E_{f2}$ and $E_{f3}$. This process is repeated, and a frequency $f_n$ at which $E_{fn}+1<E_{fn}$, that is, a frequency $f_n$ at which the output is maximized is adopted as the frequency used in a threshold setting step S04 and an alternating current supply step S05. In this way, the frequency at which the alternating-current bridge circuit 20 provides a high output for subjects M having different surface treatment states, shapes and impedances can be set in one operation. The optimum frequency varies depending on the material, shape and surface treatment state of the subject. However, if these factors are known in advance, the setting of the frequency can be omitted. In this way, the output sensitively responds to the variation of the surface treatment state, and the inspection sensitivity can be improved. The frequency setting step S03 may be performed before the variable resistor setting step S02.

<S04: First Threshold Setting Step>

A threshold used for determining whether the surface state of the surface-treated product is good or bad is set. In the following, a process of setting a threshold that is to be previously set to be used when starting evaluation of the surface-treated product (referred to as a "first threshold", hereinafter) will be described. First, the reference subject S is placed in the vicinity of the reference detector 22, and an alternating-current power with the frequency set in the frequency setting step S03 is supplied from the alternating-current power supply 10 to the alternating-current bridge circuit 20. The voltage output of the alternating-current bridge circuit 20 is amplified by the amplification circuit 31, full-wave rectified by the absolute value circuit 32, converted into a direct-current voltage by the LPF 33 and then output to the determination means 36. As subjects M, ten to several tens of each of a product yet to be treated (a steel product that is subjected to neither any heat treatment nor the SP treatment) and a heat-treated reference product (a steel product properly subjected only to a heat treatment) are prepared. Each of the product yet to be treated is placed in the vicinity of the inspection detector 23, an output value $E_A$ is measured for all the products yet to be treated, and an average value $E_{Aav}$ thereof is calculated. After that, each of the heat-treated reference product is placed in the vicinity of the inspection detector 23, an output value $E_B$ is measured for the heat-treated reference products, and ratios $E_B/E_{Aav}$ of the output values for the heat-treated reference products to the average value of the output values for the products yet to be treated are calculated. The minimum of these values is adopted as the first initial threshold $E_{th1}$.

In this way, an appropriate threshold can be precisely set with a reduced number of measurements. The initial threshold $E_{th1}$ is set as a threshold and stored in the storage means.

According to another process of setting the first initial threshold $E_{th1}$, for example, the first initial threshold $E_{th1}$ can be determined according to the following formula based on the output values $E_A$ for the products yet to be treated and a standard deviation $\sigma_A$ thereof and the output values $E_B$ for the properly heat-treated reference products and a standard deviation $\sigma_B$ thereof. When the first initial threshold is determined according to this formula, in an evaluation step described later, whether the surface treatment state is good or bad can be determined by comparing a voltage value as a second output signal with the first initial threshold.

$$E_{th1} = \frac{(E_{Aav} \cdot \sigma_B + E_{Bav} \cdot \sigma_A)}{\sigma_A + \sigma_B} \quad \text{[Formula 6]}$$

$E_{Aav}$: average value of output signals $E_A$, $E_{Bav}$: average value of output signals $E_B$ $\sigma_A$: standard deviation of output signals $E_A$ $\sigma_B$: standard deviation of output signals $E_B$ If an appropriate threshold is known in advance, the value may be adopted as the first threshold $E_{th1}$.

Furthermore, in the first threshold setting step S04, an output signal in the state where the subject M is not placed in the vicinity of the inspection detector 23 is stored in the storage means as a first initial offset value $E_{i1}$.

<S05: Alternating Current Supply Step>

The alternating-current power with the frequency set in the frequency setting step S03 is supplied from the alternating-current power supply 10 to the alternating-current bridge circuit 20. The reference subject S is placed in the vicinity of the reference detector 22.

<S06: Heat-Treated Product Placement and Preliminary Detection Step>

A heat-treated product (a steel product subjected to only a heat treatment) as the subject M is placed in the vicinity of the inspection detector 23 in such a manner that an eddy current is induced in the subject M. At the same time, in the state where the reference subject S is placed in the vicinity of the reference detector 22, the alternating-current bridge circuit 20 is allowed to output the signal of the potential difference between the points C and D. The signal is amplified by the amplification circuit 31, full-wave rectified by the absolute value circuit 32 and converted into a direct-current signal by the LPF 33, and the resulting direct-current signal of the potential difference is preliminarily detected as the second output signal. A reference state refers to a reference state used for comparison with the output of the inspection detector 23.

The temperature measurement means 38 measures the temperature of the surface of the subject M before the subject M is placed in the vicinity of the inspection detector 23 or after the subject M is placed in the vicinity of the inspection detector 23, and outputs a signal of the temperature to the determination means 36.

<S07: Inspection State Determination Step>

Whether the inspection state of the subject M is good or bad is determined. The phase comparator 34 compares the waveform of the alternating-current power supplied from the alternating-current power supply 10 and the alternating-current voltage waveform output from the alternating-current bridge circuit 20 and detects the phase difference therebetween. By monitoring the phase difference, whether the inspection state is good or not (such as whether there is no phase difference between the inspection detector 23 and the subject M) can be determined. If the phase difference significantly varies even though the output of the alternating-current bridge circuit 20 is not changed, it can be determined that there is a possibility that the inspection state has changed and the inspection has not been properly performed.

The determination means 36 determines whether the surface treatment state of the subject M is good or bad when the temperature of the subject M detected by the temperature measurement means 38 falls within the predetermined range, and does not determine whether the surface treatment state of the subject M is good or bad when the temperature detected by the temperature measurement means 38 does not fall within the predetermined range. The predetermined temperature range is a temperature range in which a variation of the temperature of the subject M does not substantially affect the inspection and can be a range from 0 to 60° C., for example. When the temperature of the surface of the subject M does not fall within the predetermined temperature range, the process may be halted until the temperature of the subject M reaches the predetermined temperature range, air may be blasted to the subject M, or the subject M is not inspected and moved to another line, for example.

<S08: Heat-Treated Product Potential Difference Signal Storage Step>

If it is determined in the inspection state determination step S07 that the inspection state of the subject M is "good", the signal of the potential difference converted into a direct-current signal by the LPF 33 in the heat-treated product placement and preliminary detection step S06 is stored in the storage means as the second output signal.

<S09: SP Treatment Step>

The SP treatment is performed on the heat-treated product for which a potential difference $E_h$ is measured. The SP treatment is performed by making a shot (a particle having a substantially spherical shape or a rounded cut wire) having a high hardness (such as a Vickers hardness Hv of 500 to 850) collide against a material to be treated at a high velocity. The values of Vickers hardness described above are measurements obtained in the testing process described in JIS Z2244 (2009).

The diameter of the projection material can be appropriately selected from a range from 0.5 to 4.0 mm. When a direct-pressure shot peening apparatus is used, for example, high-intensity projection conditions can be adopted that the projection pressure is 0.05 to 0.7 MPa and the projection amount is 20 kg/min at the maximum.

For example, the SP treatment can be performed by using steel shots having a diameter of 0.6 mm and a Vickers hardness Hv of 700 under conditions that the injection pressure is 0.3 MPa, the injection amount is 13 kg/min and the projection duration is 10 seconds.

<S10: Surface-Treated Product Placement and Detection Step>

The same step as the heat-treated product placement and preliminary detection step S06 is performed on the surface-treated product (the steel product subjected to the SP step) as the subject M, and a signal of the potential difference converted into a direct-current signal by the LPF 33 is detected as the first output signal.

<S11: Inspection State Determination Step>

Whether the inspection state of the subject M is good or bad is determined. This step is the same as the inspection state determination step S07.

<S12: Surface-Treated Product Potential Difference Signal Storage Step>

If it is determined in the inspection state determination step S11 that the inspection state of the subject M is "good", the signal of the potential difference converted into a direct-current signal by the LPF 33 in the surface-treated product placement and preliminary detection step S10 is stored in the storage means as the first output signal.

<S13: Heat Treatment Evaluation Step>

This step is a step of determining whether or not the heat treatment has been properly performed on the steel product. First, the determination means 36 computes the ratio (output voltage ratio: $E_S/E_H$) of an output voltage value $E_S$, which is the first output signal, to an output voltage value $E_H$, which is the second output signal. The determination means 36 compares the output voltage ratio with the first threshold $E_{th1}$ to determine whether the heat treatment has been properly performed or not. For example, in the example described later, it is determined that "the heat treatment has been properly performed (good product)" if the output voltage ratio is lower than the first threshold $E_{th1}$, and it is determined that "the heat treatment has not been properly performed (defective product)" if the output voltage ratio is equal to or higher than the first threshold $E_{th1}$ (see FIG. 4). The result of the determination by the determination means 36 is displayed on the display means 37, and an alarm is issued if it is determined that "the heat treatment has not been properly performed".

The excitation frequency of the coils of the reference detector 22 and the inspection detector 23 at the time when the eddy current is induced in the subject M in the heat-treated product placement step S06 and the surface-treated product placement step S10 can be set to be 500 Hz to $10 \times 10^3$ Hz. The depth of permeation of the eddy current produced by the coils into the subject M can be set depending on the depth of the layer affected by the heat treatment, so that an appropriate evaluation can be made depending on the heat treatment conditions.

If the SP treatment is always properly performed under the optimum SP treatment conditions determined in advance in the SP treatment step described above, only the degree of the heat treatment affects the determination of whether the surface treatment has been properly performed or not. In that case, the whole of the surface treatment can be evaluated in the heat treatment evaluation step S13.

If the system can be automatized, the system can be configured to feed the determination result that "the heat treatment has not been properly performed (defective product)" in the heat treatment evaluation step S13 described above back to the heat treatment step. In that case, the heat treatment conditions can be modified depending on the inspection result, the rate of occurrence of defective steel products due to defective heat treatment can be reduced.

Example

A result of inspection of the surface characteristics of the gear unit G using the surface characteristics inspection method according to the embodiment will be described. A gear unit G (good product) made of chromium molybdenum steel on which carburization had been performed under an appropriate condition and a gear unit G (defective product) on which a heat treatment had been performed under an inappropriate condition were prepared. The "inappropriate condition" was that carburization was performed twice under an appropriate condition. The SP treatment was performed by using iron-based shots (available from SHIN-TOKOGIO, LTD) having a diameter of 600 μm were used, an air shot peening apparatus (available from SHINTOKO-GIO, LTD) under conditions that the injection pressure as 0.3 MPa.

Figure 4:
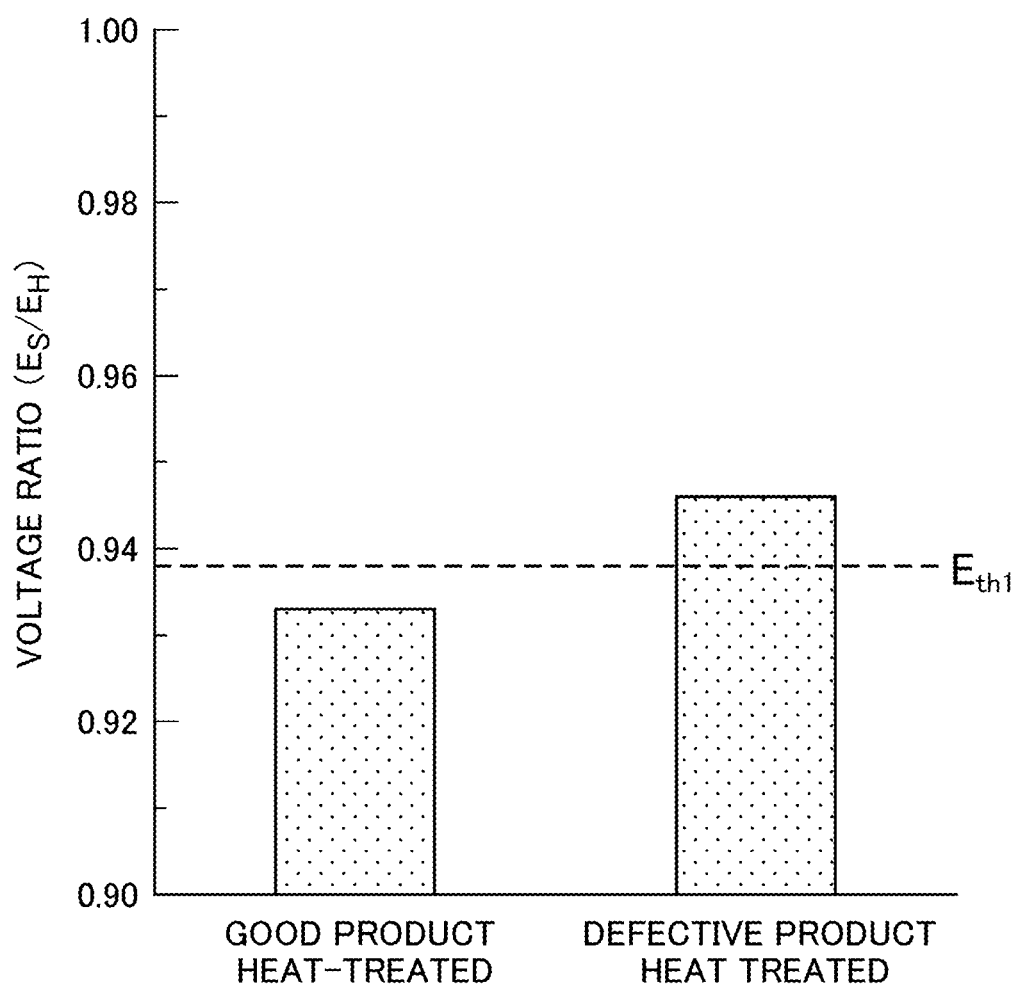
FIG. 4 is a graph showing an evaluation result in an example according to the first embodiment.

FIG. 4 shows the result of computation of the ratio (output voltage ratio: $E_S/E_H$) of the output value $E_S$ for the surface-treated product to the output value $E_H$ for the heat-treated product. Depending on whether the heat treatment has been properly performed or not, the output voltage ratio varies. Whether the heat treatment has been properly performed or not can be determined by properly setting the first threshold $E_{th1}$.

Next, another embodiment will be described as a second embodiment. The following description will be focused on differences from the first embodiment.

According to this other embodiment, the same surface characteristics inspection apparatus as in the first embodiment is used, and both the determination of whether the heat treatment has been properly performed or not and the determination of whether the SP treatment has been properly performed or not are performed.

Figure 5:
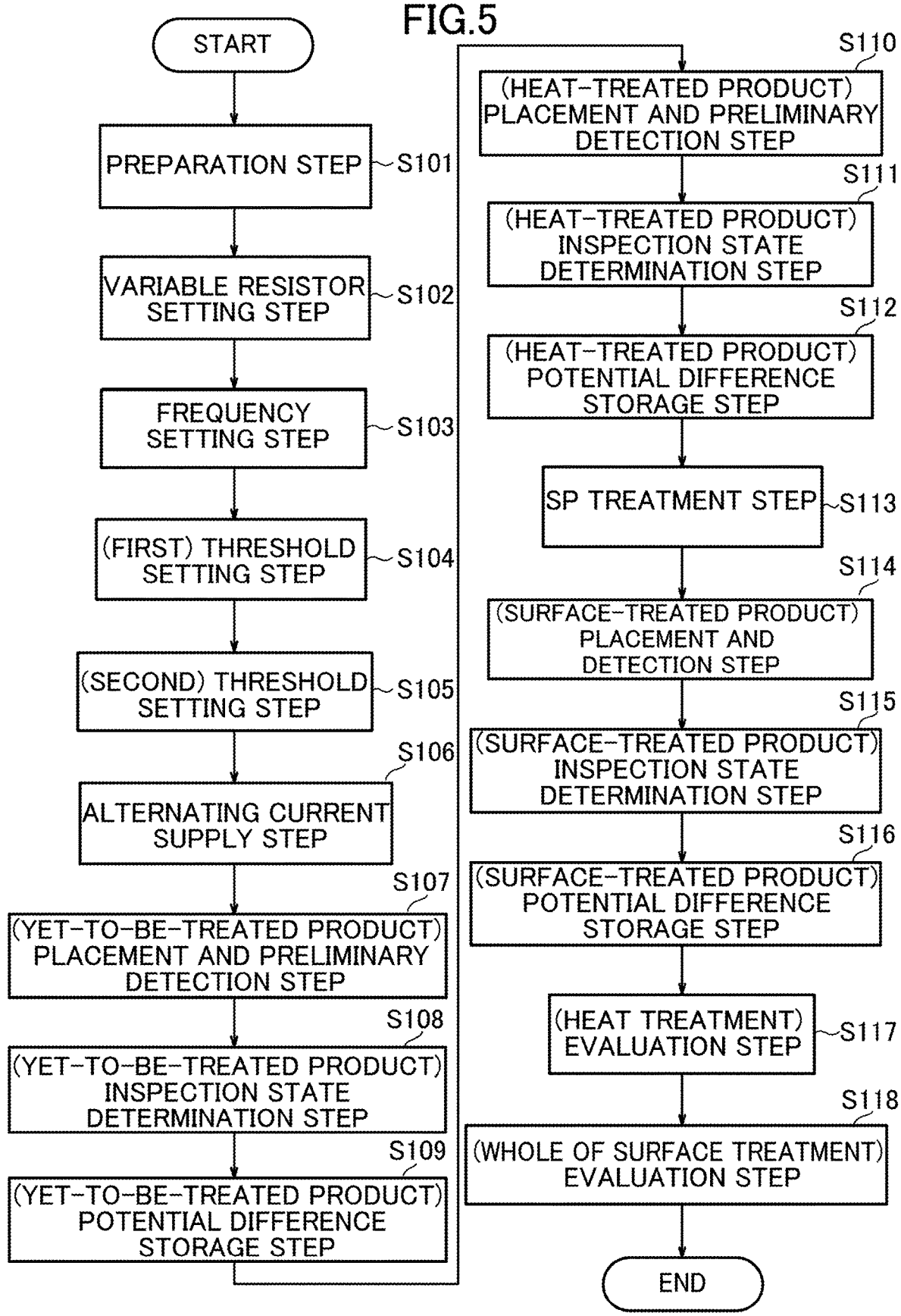
FIG. 5 is a flowchart for illustrating a surface characteristics inspection method according to a second embodiment.

FIG. 5 is a flowchart showing a surface characteristics inspection method according to the second embodiment.

The preparation step S101, the variable resistor setting step S102, the frequency setting step S103 and the first threshold setting step S104 are the same as the steps S01, S02, S03 and S04 in the first embodiment, respectively.

<S105: Second Threshold Setting Step>

Figure 6:
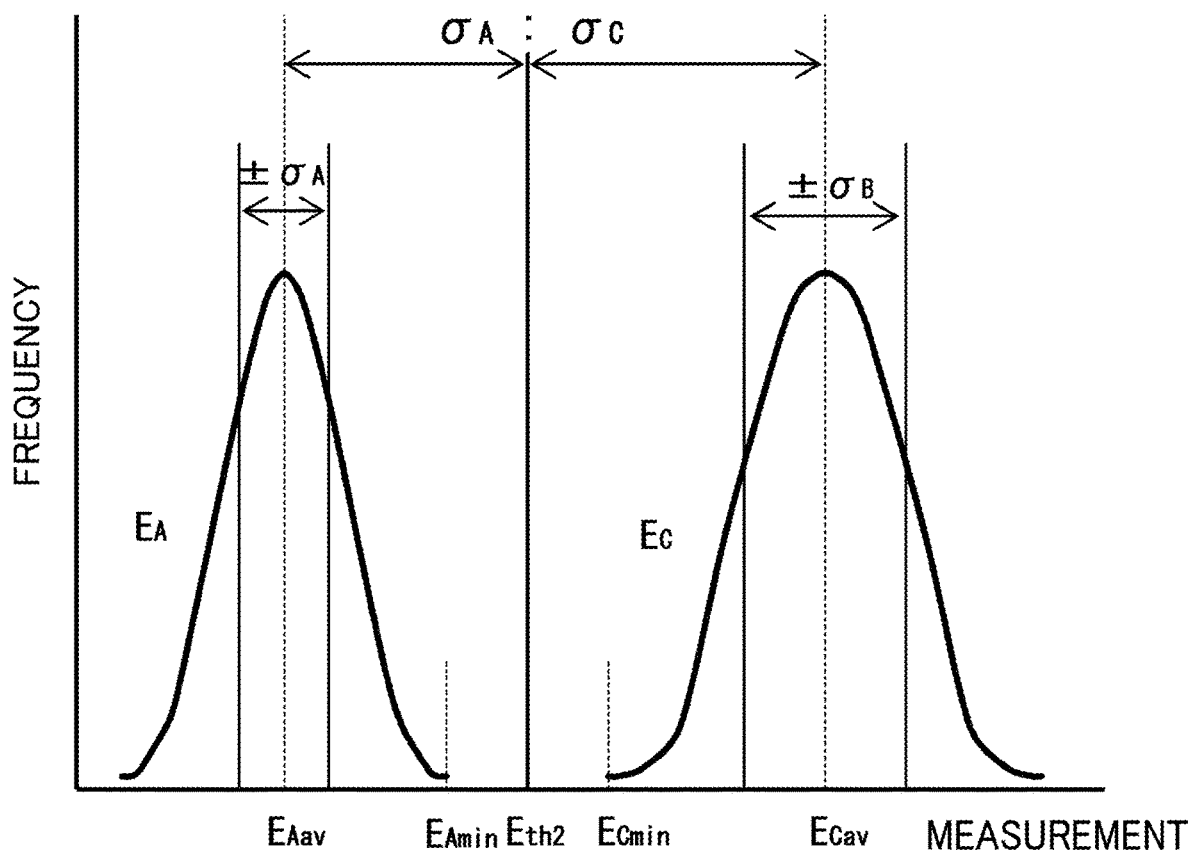
FIG. 6 is a schematic diagram for illustrating a process of setting a second initial threshold.

A threshold used for determining whether the surface state of the surface-treated product is good or bad when performing an inspection concerning the degree of the whole of the surface treatment including the heat treatment and the SP treatment is set. In the following, a process of setting a threshold that is to be set in advance to be used when starting the evaluation of the surface-treated product (referred to as a "second initial threshold", hereinafter) will be described. First, the reference subject S is placed in the vicinity of the reference detector 22, and the alternating-current power with the frequency set in the frequency setting step S103 is supplied from the alternating-current power supply 10 to the alternating-current bridge circuit 20. The voltage output of the alternating-current bridge circuit 20 is amplified by the amplification circuit 31, full-wave rectified by the absolute value circuit 32, converted into a direct-current voltage by the LPF 33 and then output to the determination means 36. Ten to several tens of each of a product yet to be treated and a good product that is determined to have been properly subjected to a surface treatment (heat treatment and SP treatment) are prepared, and a distribution of output values provided to the determination means 36 when the subjects are placed in the vicinity of the inspection detector 23 is obtained. FIG. 6 schematically shows the distribution.

The second initial threshold $E_{th2}$ is determined according to the following formula based on the output signals $E_A$ obtained when the subjects M yet to be treated are placed in the inspection detector 23 and output signals $E_C$ obtained when the subjects M subjected to the surface treatment that are good products are placed in the inspection detector 23 by considering variations of the output signals. FIG. 6 schematically shows the distributions of the output signals $E_A$ for the subjects yet to be treated and the output signals $E_C$ for the subjects subjected to the surface treatment.

$$E_{th2} = \frac{(E_{Aav} \cdot \sigma_C + E_{Cav} \cdot \sigma_A)}{\sigma_A + \sigma_C} \quad \text{[Formula 7]}$$

$E_{Aav}$: average value of output signals $E_A$, $E_{Cav}$: average value of output signals $E_C$ $\sigma_A$: standard deviation of output signals $E_A$ $\sigma_C$: standard deviation of output signals $E_C$ In this way, an appropriate threshold can be precisely set with a reduced number of measurements. The second initial threshold $E_{th2}$ is set as a threshold and stored in the determination means 36. The second initial threshold $E_{th2}$ is related to a maximum value $E_{Amax}$ of the output signals $E_A$ and a minimum value $E_{Cmin}$ of the output signals $E_C$ according to the following formula.

$$E_{Amax} < E_{th2} < E_{Cmin}$$

Even when the relation described above does not hold, an appropriate second initial threshold $E_{th2}$ can be set by considering variations of the output signals $E_A$ and $E_C$ or whether there is a singular measurement that significantly deviates from the distribution, for example. For example, a plurality of like subjects including those yet to be treated and those subjected to the surface treatment may be prepared, and the initial threshold $E_{th2}$ may be calculated again using those subjects.

If an appropriate threshold is known in advance, the value may be adopted as the second threshold $E_{th2}$.

Furthermore, in the second threshold setting step S105, an output signal in the state where the subject M is not placed in the vicinity of the inspection detector 23 is stored in the storage means as a second initial offset value $E_{i2}$.

An alternating current supply step S106 is the same as the step S05 in the first embodiment.

<S107: Yet-To-Be-Treated Product Placement and Preliminary Detection Step>

A product yet to be treated as the subject M is placed as in the heat-treated subject placement step S06 in the first embodiment.

<S108: Inspection State Determination Step>

Whether the inspection state of the subject M is good or bad is determined. This step is the same as the inspection state determination step S07 in the first embodiment.

<S109: Yet-To-Be-Treated Product Potential Difference Signal Storage Step>

If it is determined in the inspection state determination step S108 that the inspection state of the subject M is "good", the signal of the potential difference converted into a direct-current signal by the LPF 33 in the yet-to-be-treated product placement step S107 is stored in the storage means.

A heat-treated product placement step S110, a heat-treated product inspection state determination step S111, a heat-treated product potential difference signal storage step S112, an SP treatment step S113, a surface-treated product placement step S114, a surface-treated product inspection state determination step S115, a surface-treated product potential difference signal storage step S116 and a heat treatment evaluation step S117 are the same as the steps S06, S07, S08, S09, S10, S11, S12 and S13 in the first embodiment, respectively.

<S118: Surface Treatment Evaluation Step>

This step is a step of determining whether the product has been properly subjected to the surface treatment or not. The determination means 36 compares the output voltage value $E_S$, which is the first output signal, and with the second threshold $E_{th2}$, and determines that "the surface treatment has been properly performed (good product)" if the output voltage value $E_S$ is lower than the second threshold $E_{th2}$, and that "the heat treatment has not been properly performed (defective product)" if the output voltage value $E_S$ is equal to or higher than the second threshold $E_{th2}$. The result of the determination by the determination means 36 is displayed on the display means 37, and an alarm is issued if it is determined that "the surface treatment has not been properly performed".

If it is determined in the heat treatment evaluation step S117 that "the heat treatment has been properly performed" and it is determined in the surface treatment evaluation step S118 that "the surface treatment has not been properly performed", there is a possibility that the SP treatment has not been properly performed. Thus, an alarm about the possibility may be issued, and the possibility may be fed back to the SP treatment.

(Update of First Threshold and Second Threshold)

In the first and second embodiments, when the output signals $E_A$ obtained when the subjects M yet to be treated are placed in the inspection detector 23 and the output signals $E_B$ obtained when the surface-treated subjects M having a good surface state are placed in the inspection detector 23 significantly differ from each other, the first initial threshold $E_{th1}$ may come closer to the average value $E_{Aav}$ of the output signals $E_A$, and the range of outputs that are determined to be a good product may increase. The same holds true for the second initial threshold $E_{th2}$. If it is desired to set a more precise threshold, the threshold can be reset based on a large amount of inspection data accumulated by repeating the measurement using the first initial threshold $E_{th1}$ and the second initial threshold $E_{th2}$.

(Calibration of Measurements)

In the first and second embodiments, measurements can be calibrated with the first initial offset value $E_{i1}$ and the second initial offset value $E_{i2}$ and a first inspection offset value $E_{ik1}$ and a second inspection offset value $E_{ik2}$.

Furthermore, the detection signal obtained in the yet-to-be-treated product placement and preliminary detection step S107 and stored in the yet-to-be-treated product potential difference signal storage step S109 may be used to modify the first or second threshold or evaluate the reliability of the heat treatment evaluation and/or the surface treatment evaluation.

Effects of First Embodiment and Second Embodiment

As described above, whether the surface treatment including the heat treatment and the SP treatment has been properly performed on the steel product can be satisfactorily evaluated by performing measurements of the steel product after the SP treatment. This fact will be described with reference to FIGS. 7A and 7B.

Figure 7A:
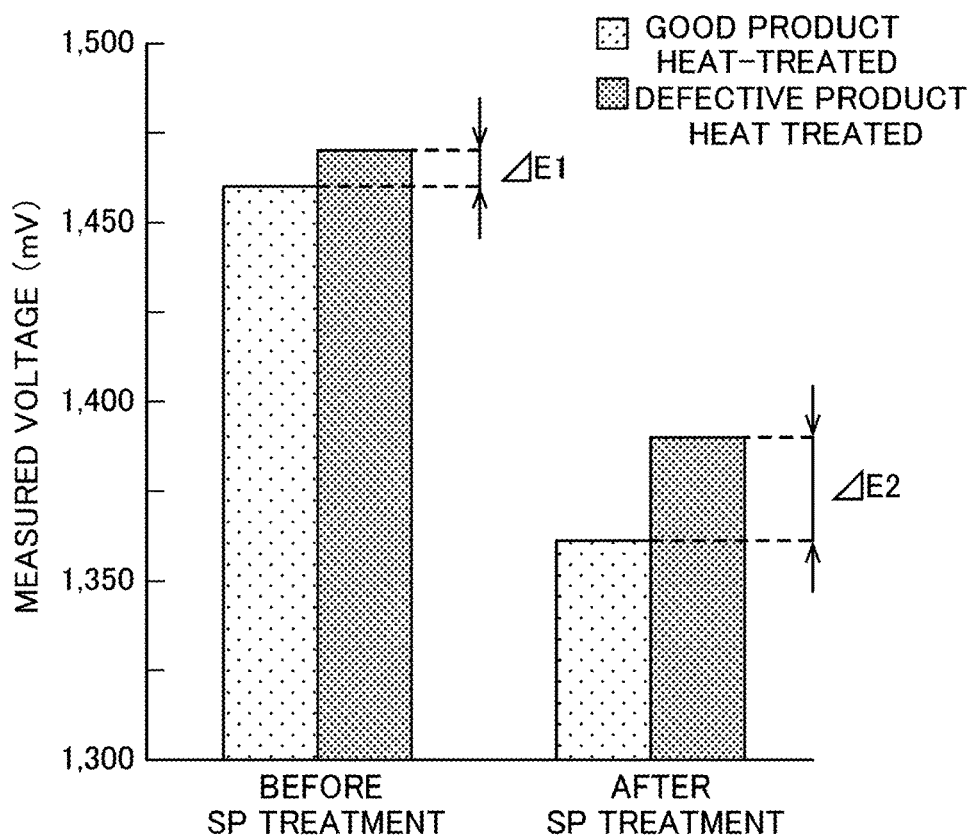
FIG. 7A is a graph for illustrating an effect of the embodiment and particularly showing variations of a measured voltage before and after an SP treatment for a product properly heat-treated and a product improperly heat-treated.
Figure 7B:
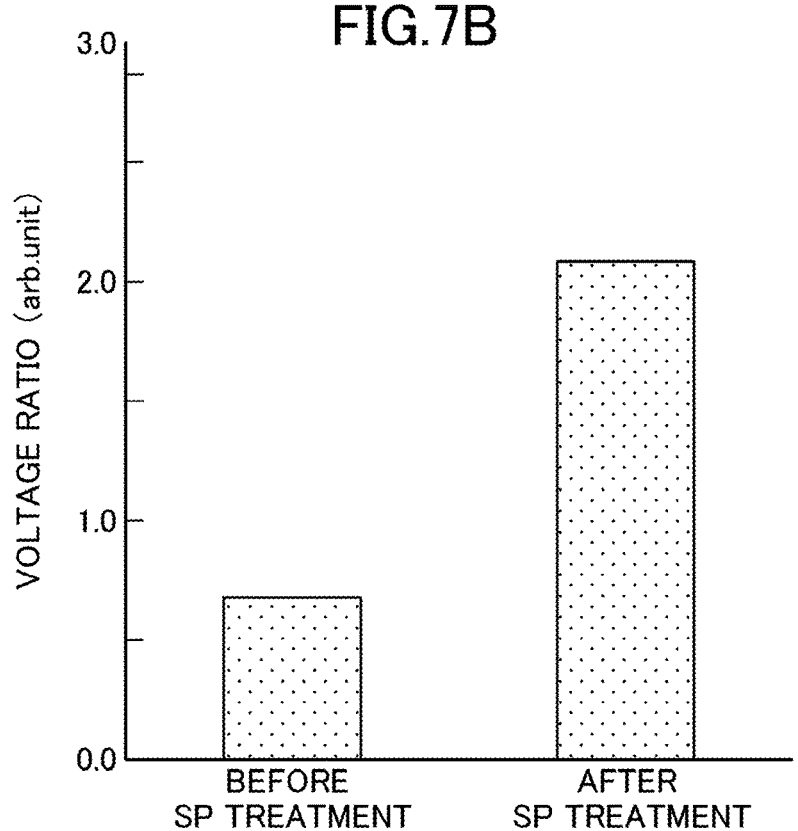
FIG. 7B is a graph for illustrating the effect of the embodiment and particularly showing a measured voltage ratio between a product properly heat-treated and a product improperly heat-treated before and after the SP treatment.

FIGS. 7A and 7B are graphs showing an edited result of measurement of the gear units G in the example described above. FIG. 7A shows measured voltages of the gear unit G (good product) and the gear unit G (defective product) before and after the SP treatment. Comparing a difference ΔE1 of the measurement between the gear unit G (good product) and the gear unit G (defective product) before SP and a difference ΔE2 of the measurement between the gear unit G (good product) and the gear unit G (defective product) after SP, the difference ΔE2 is obviously greater than the difference ΔE1. This indicates that the determination can be made with higher precision if the gear unit G is measured after the SP treatment.

FIG. 7B shows ratios (1−(gear unit G (good product)/gear unit G (defective product))×100) between the measured voltage for the gear unit G (good product) and the measured voltage for the gear unit G (defective product) before and after the SP treatment. The value after SP is obviously greater than the value before SP, and this indicates that the determination can be made with higher precision if the gear unit G is measured after the SP treatment, as in FIG. 7A.

INDUSTRIAL APPLICABILITY

Although determination concerning the surface treatment performed on the gear unit has been described in the example, the present invention can be widely applied to determination concerning the surface treatment on various steel products, such as a spring, a shaft or a bearing.

What is claimed is:

1. A surface characteristics inspection method of inspecting a degree of a heat treatment on a steel product using a surface characteristics inspection apparatus, the surface characteristics inspection apparatus including an alternating-current bridge circuit including a variable resistor divided into a first resistor and a second resistor at a division ratio, a reference detector including a coil capable of inducing an alternating-current magnetism, and an inspection detector including a coil capable of inducing an alternating-current magnetism, an alternating-current power supply that supplies an alternating-current power to the alternating-current bridge circuit, and an evaluation device that evaluates a surface characteristic of the steel product subjected to a surface treatment including the heat treatment based on an output signal from the alternating-current bridge circuit, the surface characteristics inspection method comprising:
   a preparation step of preparing the steel product subjected to the surface treatment, a reference subject having the same structure as the steel product, and the surface characteristics inspection apparatus;
   a placement step of placing the coil of the reference detector so as to induce an eddy current in the reference subject and placing the coil of the inspection detector so as to induce an eddy current in the steel product;
   an alternating current supply step of supplying the alternating-current power to the alternating-current bridge circuit;
   a detection step of energizing the coil of the reference detector and the coil of the inspection detector to make the coils produce an alternating-current magnetism to induce an eddy current in the reference subject and the steel product, respectively, and detecting, as a first output signal, an electromagnetic characteristic of the steel product in a state where the reference detector detects a reference state; and
   a heat treatment evaluation step of comparing a value computed by the evaluation device based on the first output signal with a first threshold to evaluate the degree of the heat treatment performed on the steel product,
wherein an excitation frequency of the coils of the reference detector and the inspection detector is set at 500 Hz to $10 \times 10^3$ Hz, and
wherein the detection step is performed on the steel product which has been subjected to a shot peening treatment following the heat treatment, and
the first output signal indicates the electromagnetic characteristic of the steel product subjected to the shot peening treatment following the heat treatment,
the method further comprising a preliminary detection step and a shot peening step;
wherein the steel product prepared in the preparation step is a steel product that has been subjected to the heat treatment and has not been subjected to the shot peening treatment,
wherein the preliminary detection step is performed after the preparation step and before the placement step, and in the preliminary detection step, the surface characteristics inspection apparatus detects the electromagnetic characteristic of the steel product that has been subjected to the heat treatment and has not been subjected to the shot peening treatment,
wherein in the preliminary detection step, an alternating-current voltage is supplied to the coils of the reference detector and the inspection detector to induce an eddy current in the reference subject and the steel product subjected to the heat treatment placed in the reference detector and the inspection detector, respectively, in the state where the reference detector detects the reference state, whereby the electromagnetic characteristic of the steel product is obtained as a second output signal,
wherein in the shot peening step, the shot peening treatment is performed on the steel product after the preliminary detection step, and
wherein in the heat treatment evaluation step, the evaluation device evaluates the degree of the heat treatment on the steel product based on the first output signal and the second output signal.

2. The surface characteristics inspection method according to claim 1, wherein the first threshold is a value calculated based on an electromagnetic characteristic of the steel product that is not subjected to the surface treatment and an electromagnetic characteristic of the steel product that has been properly subjected to only the heat treatment, and
wherein in the heat treatment evaluation step, the evaluation device evaluates the degree of the heat treatment on the steel product by comparing a value calculated based on the first output signal and the second output signal with the first threshold.

3. The surface characteristics inspection method according to claim 1, wherein in the heat treatment evaluation step, the evaluation device evaluates the degree of the heat treatment on the steel product by computing a ratio between the first output signal and the second output signal and comparing the ratio with the first threshold.

4. The surface characteristics inspection method according to claim 1, wherein both the first output signal and the second output signal are signals of potential differences between the reference detector and the inspection detector.

5. The surface characteristics inspection method according to claim 1, wherein the evaluation device further evaluates whether the shot peening treatment has been properly performed or not in the shot peening step by comparing the first output signal with a second threshold in the heat treatment evaluation step.

6. The surface characteristics inspection method according to claim 5, wherein the second threshold $E_{th2}$ is a value calculated according to the following formula based on an output signal $E_A$ obtained when the steel product which is not subjected to the heat treatment and the shot peening treatment, is placed in the inspection detector, and an output signal $E_C$ obtained when the steel product which is properly subjected to the surface treatment, is placed in the inspection detector:

$$E_{th2} = \frac{(E_{Aav} \cdot \sigma_C + E_{Cav} \cdot \sigma_A)}{\sigma_A + \sigma_C}$$

where $E_{Aav}$ denotes an average value of the output signals $E_A$, $E_{Cav}$ denotes an average value of output signals $E_C$, $\sigma_A$ denotes a standard deviation of the output signals $E_A$, and $\sigma_C$ denotes a standard deviation of the output signals $E_C$, and the evaluation device repeats the heat treatment evaluation step using the second threshold as an initial value.

* * * * *